United States Patent [19]

Garcia et al.

[11] Patent Number: 4,584,629
[45] Date of Patent: Apr. 22, 1986

[54] METHOD OF MAKING CERAMIC CAPACITOR AND RESULTING ARTICLE

[75] Inventors: Ricardo Garcia; Robert H. Marion, both of Myrtle Beach, S.C.

[73] Assignee: AVX Corporation, Great Neck, N.Y.

[21] Appl. No.: 633,414

[22] Filed: Jul. 23, 1984

[51] Int. Cl.$^4$ .......................... H01G 4/10; H01G 7/00
[52] U.S. Cl. ................................. 361/321; 29/25.42; 264/61
[58] Field of Search ............................. 361/308–310, 361/320, 328, 321; 264/61; 156/89; 29/25.42

[56] References Cited

U.S. PATENT DOCUMENTS

| | | | |
|---|---|---|---|
| 3,235,939 | 2/1966 | Rodriguez et al. | 361/321 X |
| 3,638,084 | 1/1972 | Burn | 361/320 |
| 4,030,004 | 6/1977 | Rutt | 264/61 X |
| 4,071,880 | 1/1978 | Rutt | 361/309 |
| 4,189,760 | 2/1980 | Marshall | 264/61 X |
| 4,482,933 | 11/1984 | Alexander | 361/321 |

FOREIGN PATENT DOCUMENTS 1178745  1/1970 United Kingdom .
2106714A 4/1983 United Kingdom ............... 361/320

Primary Examiner—Donald A. Griffin
Attorney, Agent, or Firm—Arthur B. Colvin

[57] ABSTRACT

The present invention is directed to a method of manufacturing ceramic capacitors and to the resulting capacitors. In accordance with the method a ceramic monolithic body having void areas extending to edge portions thereof is filled with molten metallic material, the edge portions to which the voids connect being previously coated with a thin layer of metallic material wettable by the injected molten metal. The injected material bonds to the predeposited metal layer with the result that the injected metal is retained within the void areas of the ceramic body. The invention is further directed to a capacitor made in accordance with the described method.

12 Claims, 6 Drawing Figures

U.S. Patent Apr. 22, 1986 4,584,629
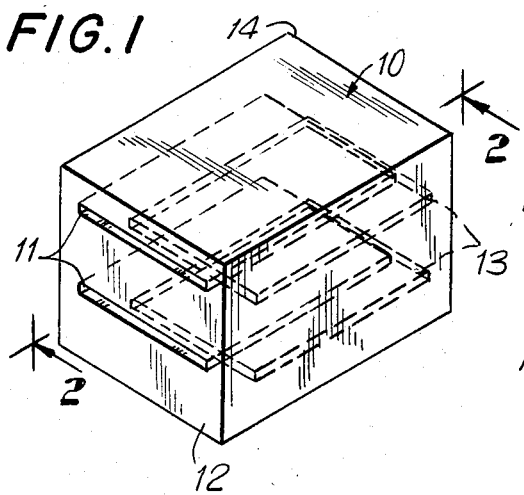
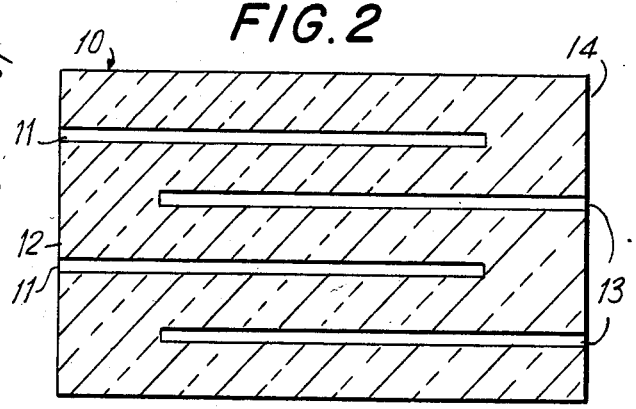
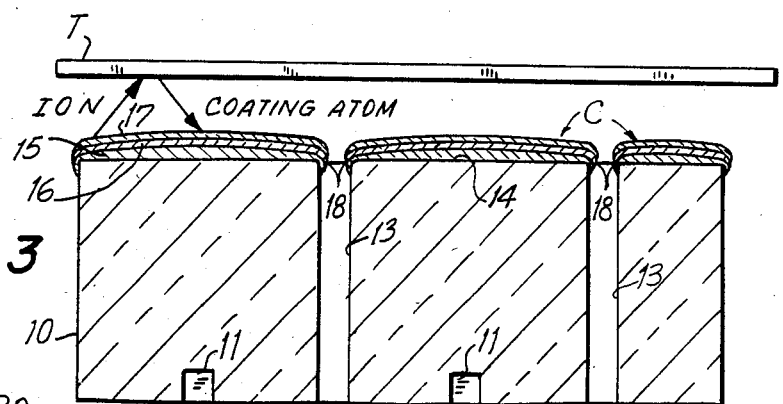
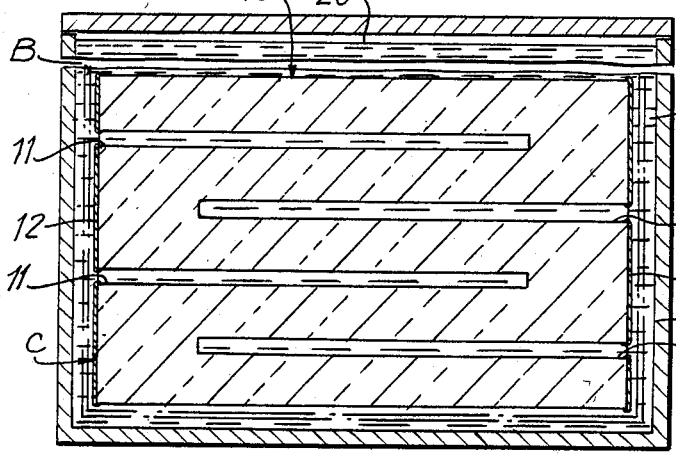
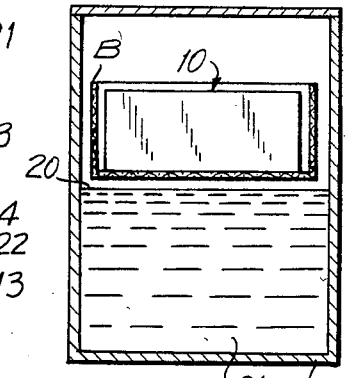
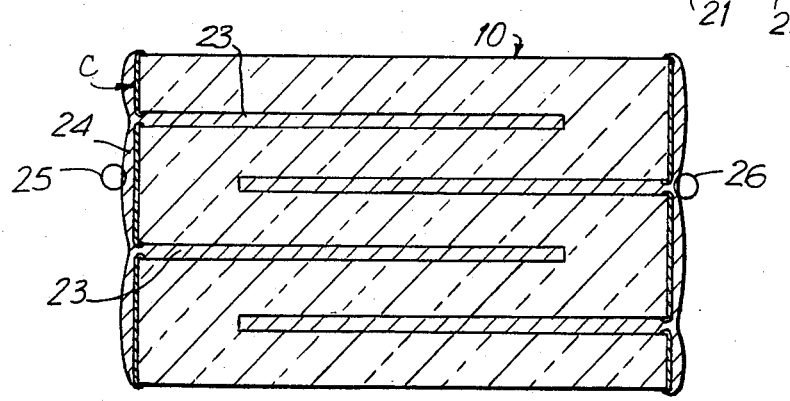

METHOD OF MAKING CERAMIC CAPACITOR AND RESULTING ARTICLE

BACKGROUND OF THE INVENTION

The present invention is directed to a method of manufacturing a multi-layer ceramic capacitor (MLC) and the resultant article.

THE PRIOR ART

Multi-layer capacitors incorporating ceramic dielectric are in wide spread use, such capacitors being employed in virtually every electronic device currently produced. It is estimated that sales of MLC's are measured in the billions annually.

Typical means of manufacturing MLC's is described generally in one or more of the U.S. Pat. Nos. 3,004,197 of Oct. 10, 1961 and 3,235,939 of Feb. 22, 1966.

The method as set forth in the noted patents comprises first forming a thin coherent layer of a finely divided ceramic powder suspended in an organic binder matrix. A layer or sheet of so-called green ceramic is thereafter imprinted with an ink which is typically comprised of a solvent, a quantity of organic filler or binder material, and finely divided particles of a noble metal such as palladium.

The ink composition noted is imprinted in a predetermined pattern on the green ceramic layer to define a multiplicity of spaced discrete areas in predetermined spacial relation to each other.

The next step of the manufacturing procedure involves stacking a multiplicity of imprinted sheets in such manner that the ink patterns of adjacent sheets overlap throughout most of their areas, but include portions which project laterally beyond the printed area of the superposed sheet.

The resultant stack is subjected to compression and is thereafter cut into individual units. The cutting is effected in such manner that end edges of the projecting portions of the printed components are exposed at opposite sides of the severed units. The individual units are thereafter heated to drive off the organic components of the ceramic binder material and the ink and thereafter subjected to heating to higher temperatures with resultant sintering of the ceramic and forming of the metallic particles into electrodes.

An aspect of the MLC's which has heretofore significantly increased the cost of manufacture has been the requirement that the metallic component of the ink, which in the finished capacitor serves as an electrode, must be capable of withstanding the high sintering temperatures necessarily applied to the ceramic. The use of electroding metals has thus been limited to costly noble metals, and particularly palladium.

In order to dispense with the necessity for employing noble metals, attempts have been made to fabricate MLC's by first forming a sintered ceramic monolith having void or substantially void areas at the positions to be occupied by electrodes. The void areas are thereafter filled or coated with electrode forming metallic materials. Since the ceramic matrix has been already sintered, and will not thereafter be subjected to inordinately high temperatures, the electrodes may be formed of base metals such as lead, tin, aluminum, copper, and alloys thereof.

A typical method utilized to fabricate the ceramic monolith with the desired void areas involves utilizing a series of green ceramic sheets or layers of the conventional sort and interposing between the layers organic materials or materials which will form a porous structure when the green ceramic is fired and sintered. Processes and articles for providing the ceramic monolith incorporating the desired void areas are discussed in the following U.S. Pat. Nos. 2,554,327 of May 22, 1951; 2,861,320 Nov. 25, 1958; 2,875,501 Mar. 3, 1959; 2,919,483 Jan. 5, 1960; 3,679,950 July 25, 1972; 3,772,748 Nov. 20, 1973; 3,829,356 Aug. 13, 1974; 3,879,645 Apr. 22, 1975; 3,965,552 June 29, 1976; 4,030,004 June 14, 1977; 4,071,878 Jan. 31, 1978; and 4,353,957 Oct. 12, 1982. A closely related mode of forming ceramic with interior voids for subsequent filling with conductive material and means for introducing the conductive material is disclosed in British Pat. No. 1,178,745 published Jan. 21, 1970.

The above cited prior art patents likewise disclose means for filling the voids with conductive material to form electrodes. Generally speaking, two distinct types of filling procedures are suggested.

In accordance with a first procedure a liquid material carrying either a suspension of conductive particles or comprising a solution of the salt of a reducible metal is impregnated into the void areas so as to coat the boundaries of the voids. In the case of the use of reducible salts the ceramic matrix after coating is heated in a reducing atmosphere so as to convert the salts to the pure metallic substance.

A further suggested method for forming conductors or electrodes is exemplified in the above referenced British Pat. No. 1,178,745. In accordance with such reference the void areas are filled with a molten metal, the metal being injected by immersing the ceramic matrix in a bath of the molten metal under subatmospheric pressures. As suggested in the noted British reference, the injection may follow a prior step wherein a wettable coating of metal is formed in the interior surface of the void areas or a spongy or porous metallic lattice is formed therein, such procedure facilitating the flow to the interior of the void areas of the molten metal.

The two above described modes of forming conductive areas within the ceramic body incorporate various drawbacks which have heretofore precluded their widespread use. With respect to the method which involves reducing salts deposited in solution to the metal stage thereof, the principal draw back has been the necessity of repeated liquid injection and reducing steps to achieve a coating of desired conductivity. Additionally, the principal salts employed comprise silver-based salts which are likewise expensive. Moreover, the resultant capacitor has proven difficult to terminate.

With respect to the electroding involving the use of molten metal fillers no significant problem is involved in filling the voids within ceramic which have been previously coated with a wettable metal film or with a wettable metal lattice. However, the inclusion of wettable metal films or lattices within the ceramic substrates involve additional manufacturing steps including firing in reducing atmospheres, which significantly complicate the manufacturing process.

The filling with molten metal into void areas between ceramic layers while conceptually the most efficient means of forming capacitors has proven difficult to practice on a commercial scale. This difficulty is engendered by the fact that molten material, the most common material employed being molten lead or lead alloys, tends to run out of the void area either totally or partially immediately upon removal of the capacitors from the molten metal bath. In other words, although it is readily possible to force or inject metal into the void areas between dielectric layers, it has heretofore been virtually impossible to assure that all of the injected material will remain within the void areas.

Since the value of a capacitor, i.e. its capacitance, is a function of the area of the electrode material, it will be readily recognized that outward flow of molten metal from portions of the void areas will drastically change the capacitance value of the finished chip.

A further difficulty inhering in the fabrication of capacitors by a metal injection process is the difficulty of terminating the capacitors. A problem arises in that even if the void areas within the ceramic remain filled with molten lead when the ceramic is removed from the impregnating bath, the molten material tends to shrink away upon cooling with the result that a space is defined between the end of the capacitor and the outermost end surface of the lead material. Where the outermost end surface of the lead material is spaced from the edge of the capacitor, it will be appreciated that termination must be effected by terminating material which extends into the interior of the capacitor a distance sufficient to contact the remaining electrode material.

In order to avoid the problems inhering in filling of ceramic dielectric bodies with molten metallic material and thereafter effecting terminations to the same, it has been proposed to cover the open end portions of the ceramic body prior to impregnation with a penetrable barrier. The barrier is said to function to prevent or limit outward flow of lead from the ceramic body.

In U.S. Pat. No. 4,030,004 there is disclosed a method employing such penetrable barriers. In accordance with this patent a slab of ceramic or glass frit with conductive material incorporated therein is formed over the end portions of the preformed ceramic body, whereby the voids within the ceramic body are covered at their end portion with a porous mask. By the use of high pressures the patent states that molten lead may be forced through the pores in the penetrable barrier and into the void areas between the electric layers of the ceramic body.

Employment of a porous ceramic mask as the penetrable barrier in accordance with the referenced patent is inefficient and on a commercial scale is inoperable, since it is necessary after injection to grind away the penetrable barrier to a depth to expose the end portions of the electrodes before effective termination can be made. Obviously, the process of grinding away the two end portions of a chip capacitor to remove the penetrable barrier particularly considering the small size of such capacitors is a complicating step which mitigates in large measure the economies effected by the avoidance of using noble metals for the electrodes.

While the noted patent suggests, as indicated above, injection of metal through an end barrier comprising a frit including conductive silver portions, and the utilization of the barrier as a terminal to which leads may be affixed, the suggested procedure is not easily achieved due to the arduous task of developing an acceptable frit. Use of this frit method also limits the choice of termination materials, i.e., it must be leach resistant, wettable, and comprised of a noble metal. More particularly, injection through the pores of the frit is accomplished only with the greatest difficulty. Moreover, the silver components of the frit are readily soluble in the injected lead material, with the result that the injection process removes the conductive components of the penetrable barrier leaving an essentially non-conductive barrier to which terminations cannot be effectively made.

SUMMARY OF THE INVENTION

The present invention may be summarized as directed to an improved method of fabricating a ceramic capacitor by molten metal injection. In accordance with the invention a ceramic body known per se and comprising a plurality of layers of dielectric having intervening voids, the voids of alternate layers opening to opposite sides of the ceramic body is first treated by metalizing the ends of the body to which the void spaces open, with a thin metal layer which is wettable by the molten material to be injected. The metal selected for formation of the metalizing coating must be adherent to the ceramic, and must be resistant to a degree to leaching into the metal to be injected.

While preferably the metalizing layer is applied by a sputtering procedure, such material may be applied in alternate manners as by plating, evaporation, chemical vapor deposition or any like means. Optionally and preferably, increments of the metal may enter slightly into the void areas, although this is by no means essential to the successful operation of the method.

The layer of metal is preferably applied while the capacitor body is encased within or protected by a mask to assure that the metalizing material engages only against the end portions of the capacitors at which the void areas are exposed, and does not form a shorting path between the end surfaces.

It is an important feature of the invention that the metal be applied in such manner that little or no clogging of the end portions of the void areas result from application of the metal, since any significant clogging has been found to greatly magnify the difficulty of impregnation with molten metal.

It is critical to the successful operation of the method that the applied metallic film be readily wet by molten injected material, and be reasonably resistant to leaching or dissolving in the periods of time necessary for impregnation.

Central to the present invention is the surprising discovery that the normal tendency of base molten metal such as lead or lead alloys to extrude from the void spaces within the capacitor body upon removal from the melt bath, is virtually completely overcome where a wettable exposed metal film surface is formed on end surfaces of the capacitor bodies before immersion. Unlike the penetrable barriers employed in accordance with the teachings of U.S. Pat. No. 4,030,004, which physically cover the openings leading to the void areas within the ceramic body and thus prevent return flow of metal through the pores of the barrier, the coating of the present invention provides no barrier to the introduction of the molten metal and is not physically penetrated by the metal and yet prevents return or outward flow after impregnation despite the absence of any barrier. Rather the molten metal passes freely to the interior of the ceramic body and would normally be expected to pass outwardly from the ceramic body.

Without limitation to any specific theory, the following explanation may be advanced. Where molten metal is injected into a ceramic body and the body is removed from the molten bath, the metal tends, by virtue of surface energy, to form into a spherical or quasi-spherical configuration externally of the void area hence causing outward flow therefrom. This tendency is reduced but not eliminated where a porous barrier as in the prior art is present over the opening to the ceramic body.

Where the end portion of the ceramic surrounding the opening is coated with an exposed surface of metal film wettable by the molten metal, the surface energy of the molten metal is minimized and the tendency of the molten metal to agglomerate into a spherical or quasi-spherical configuration externally of the void area is virtually completely eliminated. The elimination of the prior art barrier additionally facilitates filling of the void areas since the molten metal need not penetrate a blocking structure.

In accordance with a preferred embodiment of the invention the metal film is applied by a sputtering process which process results in microscopic fringes of sputtered metal material entering into the interior of the voids immediately adjacent the ends of the capacitor body. The internal material does not, to any measureable degree, interfere with the free flow of material from the molten impregnating bath into the interior of the ceramic body.

It is accordingly an object of the invention to provide an improved method of manufacturing a ceramic capacitor.

A further object of the invention is the provision of a method of the type described wherein a molten impregnating material may be readily introduced into the interior of a ceramic body and reliably retained within the ceramic body without necessitating the forcing of the molten material through a penetrable barrier.

Still a further object of the invention is the provision of a method of the type described which includes as an initial step the coating of the end portions of the ceramic body having the exposed end portions of the voids with a thin layer or film of metal material which does not register with the voids but which lines the external peripheral surface of the exposed end portions of the voids, the metal layer being wettable by and relatively resistant to leaching into the molten metal. The method includes the step of impregnating the void areas with a molten material and thereafter removing the ceramic bodies from the impregnating bath. The cavities or void areas within the ceramic body remain substantially completely filled with the metal since the metal film effectively prevents the molten metal from running out of the cavities. Moreover, the molten material upon cooling remains reliably electrically connected to the metal film. Moreover, the impregnated material forms a continuous path to the exterior surface, whereby terminations to the capacitor may be effected by soldering either to the impregnated material on the surface or to increments of the metal film.

Whereas, in accordance with prior methods, there was substantial tendency of even the molten components remaining within the ceramic body to shrink away from and thus become recessed from the surface of the body, thereby making termination to the recessed impregnant components difficult, the filler metal in accordance with the present invention remains reliably electrically connected to the film and forms a continuous path to the outside surface, thereby simplifying termination, and assuring that, since all electrodes remain in contact with the film and a continuous path is formed, a predictable capacitance value of the finished capacitor is achieved.

The invention is further directed to a capacitor device manufactured in accordance with the method of the present invention.

In accordance with a further aspect of the invention, the metal film may be comprised of a series of layers, notably a first layer which is strongly adherent to the ceramic material, and a covering layer which is bondable to the first deposited metal layer and also readily wet by the molten impregnating material. Desirably, a thin layer of an oxidizing resistant layer may be applied over the second layer to assure that the second layer does not oxidize and thus lose its high wettability characteristic.

In order to attain these objects and such other objects as may appear herein or be hereinafter pointed out reference is made to the accompanying drawings in which:

FIG. 1 is a diagrammatic perspective view of a ceramic matrix in condition for electroding and termination;

FIG. 2 is a vertical section taken on the line 2—2 of FIG. 1;

FIG. 3 is a fragmentary enlarged sectional view illustrating the sputtering procedure applied to an end of the ceramic matrix.

FIGS. 4 and 4a are sectional views of the matrix schematically illustrating the filling or electroding steps.

FIG. 5 is a sectional view similar to FIG. 2 diagrammatically illustrating the condition of the capacitor emerging from the electroding step after cooling.

Referring now to FIGS. 1 through 5, there is disclosed in accordance with the invention a ceramic monolith 10 comprised of a ceramic composition having a high dielectric constant or K, such as by way of illustration barium titanate. The ceramic composition, and the methods and formulations for compounding same, are well known in the art, illustrative examples of such compositions and method being disclosed in U.S. Pat. Nos. 3,004,197 and/or 3,235,939 which are incorporated herein by reference. Alternate formulations and methods of making the same which may be satisfactorily employed are set forth in the references cited under the PRIOR ART section of the instant application.

The ceramic monolith 10 which is illustrated by way of example as an elongate parallelepiped, includes a series of overlapping void or semi-void areas illustratively 11—11 opening to the side edge 12 of the monolith and 13—13 opening to the side edge 14 of the monolith. Means for forming the void areas 11—11 and 13—13 within the ceramic monolith are described by way of example in the PRIOR ART section of the instant application.

The term void area as used herein is intended to mean areas which are free or essentially free of dense ceramic material, and hence subject to being filled by molten metallic material for forming electrodes. In accordance with known prior art methods, thin sheets of green ceramic are formed each containing an organic binder. The sheets are imprinted as by screen printing or the like with an ink or paste which may include an organic solvent, bulking agents such as binders and ground ceramic particles, the latter functioning in known manner to prevent collapse of adjacent ceramic layers during subsequent firing, and thereafter heated progressively to burn out binder and organic components and sinter.

U.S. Pat. Nos. 2,554,327, 2,861,320, 2,875,501 and 2,919,483 cited infra constitute representative examples of means of forming a ceramic monolith having void areas as a result of incorporating solid increments of organic material between layers of dielectric.

Common to all of the noted methods of forming void areas in the dielectric is the concept of embodying between adjacent dielectric forming ceramic layers, of concentrations of organic materials or like materials which when subjected to heat will volitalize and exit from the ceramic through the open end portions at the side edges 12 and 14 of the ceramic prefired chip.

For purposes of simplicity, the monolith 10 has been illustrated as including only four (4) void areas 11—11, 13—13. In practice, however, up to sixty (60) or more such void areas may be formed in a single chip.

Alternate means for forming void or substantially void areas are described in U.S. Pat. Nos. 3,679,950 and 3,879,645 cited infra. In accordance with the first mentioned of the two noted patents the void areas are comprised of porous ceramic layers. In accordance with the latter patent the void areas are interrupted by a series of pillars or granules of metal or ceramic.

By way of illustration and without limitation a representative example of a ceramic capacitor in accordance with the invention may comprise a ceramic monolith 130 mils long, the side edges 12-14 being square in configuration each such side edge being approximately 50 mils in dimension. A capacitor of the noted size may include by way of example twenty (20) void areas 11 opening to the side 12 and extending toward and terminating short of the side edge 14, and a similar number of void areas 13 extending from the side edge 14 toward but terminating short of the opposite side edge 12. The void areas may be approximately 30 mils in width and approximately 0.2 mils in thickness. A capacitor utilizing a barium titanate matrix of the dimensions noted above may provide a capacitance of approximately 0.1 microfarad and be rated at 50 working volts.

The ceramic monolith 10 in accordance with the embodiment of FIGS. 1 through 5 is next subjected to sputtering steps to cover the ends 12 and 14 at which the void areas 11-13 respectively are open. Suitable means for effecting the sputtering step are described in detail in copending application Ser. No. 305,488 feild Sept. 25, 1981, the disclosure of which application is herein incorporated by reference. Since modes of sputtering are, per se, well known to those skilled in the art, only a brief reference thereto will be hereinafter made. The sputtering step is diagrammatically illustrated in FIG. 3.

Briefly, the steps whereby ends 12 and 14 are sputtered comprise mounting a multiplicity of the monoliths in a masking device which shields all but the surface to be sputtered, i.e. the entire surface 12 and/or 14. The noted surface is preferably first sputter etched to effect complete cleaning and preferably also to provide a rugous or corrugated impact area for the subsequently applied metal layers. The cleaned surface is sputter coated by passing the same beneath the target T of a sputtering device. Optionally, but preferably, an in-line sputtering system such as a system identified as the SERIES 900 SPUTTERING DEVICE as manufactured by Materials Research Corporation of Orangeberg, N.Y. is employed.

As more fully set forth hereinafter, an in-line sputtering system is advantageous in that it permits the surfaces 12 and 14 to be progressively advanced beneath target areas of different compositions whereby a layer of a first sputter deposited material may be formed directly over the surface to be sputtered and thereafter subsequent additional layers coated thereover.

By way of example and without limitation, a fixture loaded with a multiplicity of chips is placed in a vacuum load lock which is pumped to a pressure of less than about $50 \times 10-3$ torr prior to introducing the fixture into the main vacuum sputtering chamber. The loaded fixture is moved to an R.F. sputter etching station wherein the pressure is less than $5 \times 10-6$ torr. A high purity argon gas is introduced into the etcing chamber to achieve a pressure of about $10 \times 10-3$ torr. The parts may be etched for approximately 30 seconds at a power level of about 1.5 kilowatt. The fixture carrying the etched capacitor is then traversed to a station as illustrated in FIG. 3. Preferably a sequence of sputtered layers are applied, each of which layers is formed of a metal having a particular desired characteristic. By way of example and in accordance with a preferred embodiment a first sputtered layer of chromium may be applied to a thickness of approximately 0.05 micrometers. Thereafter, as over sputtered nickel layer of approximately 0.12 micrometers is applied. Finally, a sputtered silver layer is applied over the nickel layer to a thickness of approximately 0.1 micrometers.

As is illustrated diagrammatically in FIG. 3, the result of the sputtering procedure, which is carried out utilizing the target T which is disposed generally parallel to the surface to be sputtered, is the dislodgement of ions of the metal target and the impacting of said ions onto the surface 12 or 14. As a result of the sputtering procedure, as illustrated in FIG. 3, ions of the target metal are directed against the sputtered surface at a series of angles with the result that the sputtering process forms a coating not only on the end surface of the side edges 12 and 14, but also enters a short distance into the interior of the void areas 11 and 13 respectively as at 18, leaving the major area of the end portion of the void area open.

Referring again to FIG. 3 there is diagrammatically illustrated the formation of a coating C comprised of three layers, namely a base layer of chromium 15, a covering layer of nickel 16, and a surface layer of silver 17. FIG. 3 further illustrates the fact that the layers 15, 16, 17 extend slightly into the void areas as at 18. The penetration distance of the sputter material into the void areas is, or course, a function of the sputter system conditions and the dimensions of the sputtered chips. With a chip in the size range hereinabove specifically set forth, the sputter coating or coatings rarely enter into the void areas a distance of more than a fraction of a mil.

It is important to note that the practice of the instant method is by no means limited to the use of a sputtering method, nor is the effectiveness of the method limited to end coating procedures in which portions of the metal film enter into the interior of the voids. The metal film may be formed by plating, metal evaporation techniques, chemical vapor deposition techniques, and the like. Sputtering is, at present, considered the preferred mode due to its versatility, ability to apply successive coatings of different metals, and the fact that increments of sputtered metal tend to enter slightly within the voids.

In FIGS. 4 and 4a there is diagrammatically illustrated the electroding procedure whereby electrode metal is introduced into the open ends of void areas 11 and 13. In accordance with this procedure a multiplicity of pre-sputtered chips are disposed in a basket B, such as a stainless steel mesh basket, one chip being illustratively shown. The chips supported in the basket are preheated. The preheating step may be carried out by supporting the basket B in close proximity to the surface 20 of a pool of molten electroding material 21 disposed in the evacuable chamber 22. Preferably, the preheating step is carried out in a helium environment under compression of approximately 10 lbs. per square inch, the helium functioning to prevent oxidation of the sputtered coating and assuring effective heat transfer from the molten metallic material to the chip. When chips are sufficiently heated, the preheating being effected principally to prevent breakage of the chips when the same are immersed in the molten material 21, the gas pressure in chamber 22 is reduced to a level of approximately 500 microns of mercury and the basket B containing the chips immersed in the metallic mass 21 as shown in FIG. 4.

While numerous molten metallic materials may be employed as the electroding medium, a preferred example of metal composition is comprised of an alloy incorporating 97½% lead, 1% tin and 1½% silver.

As the parts are dipped in the molten metal they are slowly jogged for a period of about 2 to 4 seconds during which the chamber is rapidly pressurized to 300 lbs. per square inch utilizing nitrogen gas as the pressurizing agent. The basket containing the parts remains in the molten metal for another 3 to 6 seconds following which the basket is removed to a level above the molten metal and vigorously jogged to dislodge excess metal from the parts. The cooled and electroded parts are illustrated in FIG. 5.

The finished and cooled part will be observed to include conductive electrode layers 23 disposed between the previously described ceramic layers. Additionally, it will be observed that a mass 24 of the cooled electroding material will adhere to the exterior surface of the sputtered metal film C defined by coatings 15, 16, 17.

It is important to note that upon cooling, if it were not for the excess mass 24 of metal adhering to the external surface of the sputtered layer, there would be a substantial tendency for the electrode layers 23 to contract and to receed from the edge margins of the capacitors. In other words, the mass 24 acts in the manner of a reservoir such that when the internal electroding material shrinks upon cooling, increments of the reservoir components 24 will flow with the internal components of the electroding material to assure that there is no break or separation of an internal electrode from the mass 24.

It is important to note, that the ability to maintain electrical contact between internal electrodes 23 and the external reservoir 24 during the cooling period is possible only because an excess of metal remains bonded to the external surface of the wettable metallic film to define a reservoir. This is in direct contrast to the disclosure of U.S. Pat. No. 4,030,004, cited hereinbefore, wherein the inability of the molten metal to wet to the porous ceramic prevents the existence of a reservoir. Where such porous barrier material is present, there is no reservoir of material present, and the shrinkage of the internal electrode material results in a discontinuity between the internal electrode and the exterior surface.

After the finished capacitor has cooled it is readily possible to solder leads 25,26 to the end termination portions if leads are required. In many instances, the capacitor may be utilized without the addition of leads.

Where, as is preferred, multiple layers of sputtered material are employed it is altogether feasible to employ as the final or outermost sputtered layer a metal such as silver which will leach into the molten filler material and be dissolved therein. It will thus be observed that the silver layer functions as an oxidizing preventitive, a particularly important application where an appreciable time passes between sputtering of the chip bodies and immersion in the electroding molten material. In addition, the highly wettable silver by dissolving into the mass of molten lead or lead alloy appears to enhance the ability of the molten material to wet to and bond to the underlying metals which were applied by sputtering or other metalizing procedures.

As will be apparent from the preceeding description there is described in accordance with the present invention a unique system for reliably and effectively filling and terminating capacitors of the type wherein the electrodes are formed of injected molten metallic materials. The method constitutes a significant advance over patents such as U.S. Pat. No. 3,965,552 and 4,030,004 wherein retention of the injected molten material within the voids of the capacitor body is attained only by injecting the molten metal through the pores of a ceramic barrier or a glass frit. The requirement of injecting through pores greatly increases the difficulties of effecting injection and results in frequent instances of only partial filling of the cavities. Additionally, where a porous ceramic material is employed as the penetrable barrier it is necessary, following injection, to grind away the penetrable barrier to a depth to expose the end portions of the electrode layers.

Additionally, where the penetrable barrier is comprised of a frit of glass with conductive components, the conductive elements are to a degree leached from the frit in the course of injection.

As will be apparent to those skilled in the art and made conversant with the instant disclosure, numerous variations in details of construction, and modes of practice may be readily effected without departing from the spirit of the present invention. Accordingly, the same is to be broadly construed within the limitations of the appended claims.

Having thus described the invention and illustrated its use, what is claimed as new and is desired to be secured by Letters Patent in the United States is:

1. The method of manufacturing a multilayer ceramic capacitor which comprises the steps of forming a monolithic sintered ceramic body having a plurality of parallel layers of ceramic dielectric material, said body including a plurality of parallel substantially metal free void areas between said layers, alternate said void areas opening at exit portions at first and second opposite sides of said body, forming on said first and second sides a continuous metallic coating, said coating covering the ceramic components of said first and second sides and leaving said exit portions substantially completely uncovered, immersing said ceramic body having said coatings into a molten bath of metallic filler material capable of wetting said metallic coatings for a time sufficient to substantially fill said voids, said bath being maintained at a temperature below the melt point of said coating, removing said filled bodies from said bath while said filler metallic material remains in molten condition to thereby provide over the exterior exposed surfaces of said metal coatings a continuous layer of molten filler metallic material in communication with the increments of said filler metallic material in said void areas, and thereafter cooling said filled bodies to thereby form a capacitor.

2. The method in accordance with claim 1 wherein said filler metallic material comprises lead.

3. The method in accordance with claim 1 wherein said metallic coating is applied by sputtering.

4. The method in accordance with claim 3 wherein said sputter applied coating adheres to the walls defining said void areas at positions immediately adjacent said exit portions.

5. The method in accordance with claim 4 wherein said metal coating comprises a plurality of metallic layers namely a first layer adherhent to said ceramic body, a second layer adherent to said first layer and readily wettable by said filler metallic material, and a third layer adherent to said second layer and resistant to oxidation, the material of said third layer being readily dissolved in said molten metallic filler material.

6. The method in accordance with claim 5 wherein said metallic filler material comprises lead, said first metallic layer comprises chromium, said second metallic layer comprises nickel, and said third metallic layer comprises silver.

7. The method in accordance with claim 1 and including the step of applying conductive lead members to said layers of filler material covering said metallic coatings.

8. A capacitor comprising a monolithic ceramic body having a plurality of parallel layers of ceramic dielectric material, said body including a plurality of overlapping initially metal free void areas between said layers, alternate said void areas opening to opposite side edges of said body at exit areas, a metallic coating formed on and covering substantially the entirety of said opposite side edges of said body, including the areas immediately surrounding said exit areas, metallic filler material substantially completely filling said void areas and said exit areas, and said exit areas being fully covered by said filler material, said metallic filler material being of a lower melting temperature than the metal of said coating and being selected to wet to the metal of said coating.

9. A capacitor in accordance with claim 8 wherein said coating is applied by sputtering.

10. A capacitor in accordance with claim 9 wherein increments of said coating enter into said void areas.

11. A capacitor in accordance with claim 9 wherein said metallic coating include a first metallic layer strongly adherent to said ceramic and a second metallic layer adherent to and covering said first layer, said second metallic layer being bonded to said cast metallic material.

12. A capacitor in accordance with claim 9 and including a lead member mechanically and electrically connected to each of said cast metallic structures.

* * * * *